US011511433B2

(12) United States Patent
Hauser et al.

(10) Patent No.: US 11,511,433 B2
(45) Date of Patent: Nov. 29, 2022

(54) COLLISION-DETECTION DEVICE FOR GRIPPER SYSTEMS AND METHOD FOR DETECTING A COLLISION

(71) Applicant: Robert Bosch GmbH, Stuttgart (DE)

(72) Inventors: Friedrich Hauser, Ditzingen (DE); Javier Stillig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 16/901,318

(22) Filed: Jun. 15, 2020

(65) Prior Publication Data
US 2020/0398431 A1 Dec. 24, 2020

(30) Foreign Application Priority Data
Jun. 18, 2019 (DE) ...................... 10 2019 208 808.2

(51) Int. Cl.
*B25J 9/16* (2006.01)
*B25J 15/00* (2006.01)
(Continued)

(52) U.S. Cl.
CPC ........... *B25J 9/1676* (2013.01); *B25J 9/1694* (2013.01); *B25J 13/085* (2013.01);
(Continued)

(58) Field of Classification Search
CPC ...... B25J 9/1676; B25J 9/1694; B25J 13/085; B25J 15/0028; B25J 19/0029;
(Continued)

(56) References Cited

U.S. PATENT DOCUMENTS 6,777,903 B1 * 8/2004 Ostwald .................... B25B 1/08
901/31
9,302,396 B2 * 4/2016 Mattern ............... B25J 17/0225
(Continued)

FOREIGN PATENT DOCUMENTS

CN 108602187 A * 9/2018 ......... B23K 26/0884
DE 92 08 980 U1 12/1993
(Continued)

OTHER PUBLICATIONS

DE9208980.English.Translate (Year: 1993).*
(Continued)

*Primary Examiner* — B M M Hannan
(74) *Attorney, Agent, or Firm* — Maginot, Moore & Beck LLP (57) ABSTRACT

A collision-detection device for a gripper system of a handling device, with at least two gripping jaws arranged on a flange plate, detects collisions between the gripper system and an object. The device includes a safety device configured to lock the collision-detection device to the gripper system and/or dampen the collision-detection device with the gripper system. The safety device is configured to receive from the flange a change in force and/or a change in torque generated by contact between the gripping jaws and the object. The device further includes a sensor configured to detect a change in distance which exceeds a predetermined permissible change in distance between the flange plate and a reference, the change in distance resulting from the at least one of the change in force and the change in torque.

10 Claims, 4 Drawing Sheets

(51) Int. Cl.
  *B25J 19/00* (2006.01)
  *B25J 19/06* (2006.01)
  *B25J 19/02* (2006.01)
  *B25J 13/08* (2006.01)
(52) U.S. Cl.
  CPC ....... *B25J 15/0028* (2013.01); *B25J 19/0029* (2013.01); *B25J 19/0091* (2013.01); *B25J 19/02* (2013.01); *B25J 19/063* (2013.01)
(58) Field of Classification Search
  CPC ...... B25J 19/0091; B25J 19/02; B25J 19/063; B25J 17/0208; B25J 9/1689; B25J 13/087; B25J 15/08
  USPC .................................................. 700/255, 258
  See application file for complete search history.

(56) References Cited

U.S. PATENT DOCUMENTS

| | | | | |
|---|---|---|---|---|
| 2009/0095109 A1* | 4/2009 | Mizuno | .................. | B25J 19/063 700/258 |
| 2014/0025197 A1* | 1/2014 | Mattern | ............... | B25J 17/0225 700/218 |
| 2014/0067121 A1* | 3/2014 | Brooks | .................. | B25J 9/1676 700/255 |
| 2019/0030714 A1* | 1/2019 | Knopf | ................. | F15B 13/0402 |
| 2019/0210223 A1* | 7/2019 | Goldberg | ............... | B25J 9/1669 |
| 2019/0248002 A1* | 8/2019 | Deyle | .................... | B25J 13/006 |
| 2019/0351549 A1* | 11/2019 | Suzuki | ................. | B25J 15/0042 |

FOREIGN PATENT DOCUMENTS

| | | | |
|---|---|---|---|
| DE | 20 2004 007 938 U1 | 10/2005 | |
| DE | 20 2013 105 501 U1 | 4/2015 | |
| DE | 102019107851 A1 * | 10/2020 | ............ B25J 13/085 |

OTHER PUBLICATIONS

DE202004007938.English.Translate (Year: 2005).*
DE202013105501.English.Translate (Year: 2015).*
European Search Report corresponding to European Patent Application No. 20 17 5583, dated Nov. 5, 2020 (8 pages).

* cited by examiner

COLLISION-DETECTION DEVICE FOR GRIPPER SYSTEMS AND METHOD FOR DETECTING A COLLISION

This application claims priority under 35 U.S.C. § 119 to patent application no. DE 10 2019 208 808.2, filed on Jun. 18, 2019 in Germany, the disclosure of which is incorporated herein by reference in its entirety.

The present disclosure relates to a collision-detection device for gripper systems of handling devices and, in particular for use in collaborative robotic applications and machine applications and to a method for detecting a collision.

BACKGROUND

In this context, it is known from the internal prior art of the applicant that safety devices are used to avoid collisions of handling devices and objects and, in particular, to avoid collisions of the gripper system arranged on the handling device, or the gripped material gripped by the gripper system, and objects. In this context, these devices ensure that either the distance between the handling device, gripper system or gripped material and object is sufficiently large depending on the application (as prescribed in DIN EN ISO 13857), or that collisions do not generate any injury or damage to the object by reducing the force or torque (ISO/TS 15066).

Distance-maintaining safety devices are, in this context, for example enclosures such as suitably positioned protective meshes but also safe protection systems which measure in a contactless fashion. Alternatively, safety systems are also known which are based on the reduction in force and torque mentioned above. However, in practical applications in this context, in particular when handling large and changing loads, the systems for monitoring force and torque are significantly disadvantageous, since the travel speed of the handling device is greatly reduced compared to the nominal travel speed and/or the monitoring of changing loads which are picked up by the handling device with the gripper, referred to as the robot end effector, are/is inevitably very costly.

Furthermore, the problem also arises that, in particular in robotics, undesired contacts can occur between the gripper system and the gripped material and other objects (collision movements, crashing), for example as a result of incorrect programming of the robot. In this context, the dangers presented by contact can extend from damage to the gripped material or object up to fatal injury of a human being.

SUMMARY

The present disclosure is therefore based on the object of making available a collision-detection device and a method for detecting a collision which does not restrict the handling device in its functions and which is suitable for preventing damage and injury to the colliding objects. This object is achieved according to the disclosure by means of the subject matters disclosed herein.

The disclosure is therefore directed at a collision-detection device for gripper systems of handling devices for detecting collisions between the handling device together with the gripper system and objects, wherein the gripper system has at least two gripping jaws which can be moved with respect to one another in order to open and close and which are arranged on a flange plate, wherein the collision-detection device has at least one sensor and at least one safety device for detecting collisions.

According to the disclosure, the safety device is suitable and provided for locking and/or damping the collision-detection device with the gripper system mounted on the flange plate, wherein a change in force and torque which occurs when the gripping jaw is in contact with the object can be transmitted to the safety device via the flange plate, and the at least one sensor can detect that a change in distance of the flange plate which is permissible on the basis of the change in the force and change in the torque has been exceeded.

Accordingly, the position of the flange plate preferably changes as a result of a change in the force and/or of the torque, which is caused in the case of a collision. The change in distance of the flange plate is preferably expressed here through the flange plate moving closer and/or away to and/or from a housing of the collision-detection device, wherein this change in distance is preferably detected by the sensor.

The objects are preferably people, animals or items which should only enter into contact with the gripper system to the extent as is appropriate for the maximum permissible limiting values. The items which are to be gripped by the gripper system may be located, for example, in a different position than specified by the control unit of the handling device and therefore may not be able to be gripped by the gripper system or may collide with it, which can lead to damage to the gripper system and/or to the item.

If there is the danger of the handling device or the gripper system colliding with people, when configuring the handling system attention is to be paid to the maximum permissible force effect or torque effect according to ISO/TS 15066 on people, and the latter must not be exceeded since otherwise there is the danger that in the event of a collision operating personnel, servicing personnel or other persons who are located in the surroundings of the handling device will be injured.

The collision-detection device, and particularly preferably the safety device, are preferably embodied in such a way that said safety device permits the gripping jaw to move when the gripper system is in contact with an object. This geometrically conditioned flexibility of the safety device accordingly prevents damage and injury to objects.

The exceeding of the permissible change in position of the flange plate preferably permits conclusions to be drawn here about a collision between the gripper system and the object. This permissible change in position or distance can preferably be different here in various working areas of the handling device. If the permissible change in distance is exceeded, the movement of the handling device is preferably brought to a stop by means of a control device which is in communication with the sensor and/or the safety device. The handling device can accordingly be stopped in good time in order to prevent damage or injury to objects, wherein said damage or injury is, in particular, also prevented before the handling device stops, by the flexibility of the collision element. The configuration according to the disclosure accordingly prevents damage and injury in the event of collisions, by virtue of double safety measures (stopping and geometric flexibility).

This preferably depends on whether a collision with people is possible or not within a specific area. If the handling device is, for example, located in an area in which gripping activities are to be carried out and objects are to be gripped, this permissible change in distance is preferably greater than in areas in which, for example, the handling device interacts with people and/or activities of the handling device are assisted by operators. This greater permissible change in distance is necessary here, since otherwise no objects can be gripped by the handling device, since when the gripping jaw first makes contact with the object the handling device would be made to stop. It is also preferred that collision detection takes place after the gripping of the object in order to prevent damage or injuries which would arise as a result of a collision of the gripped material with objects.

The advantages which are achieved with the disclosure accordingly lie, in particular, in the fact that in the event of a collision of the gripper and/or gripped material with objects reliable collision detection takes place by means of the at least one sensor, which is preferably a position measuring device or a proximity switch.

The handling device is preferably a collaborative robot system. A collaborative robot system is here understood to be an (industrial) robot which is active together with people in a working space and is not separated from said space by protective devices.

A sufficient travel speed of the handling device can be selected in accordance with a design of the collision-detection device (geometrically conditioned flexibility and reaction speed of the element). It is also necessary to take into account the geometry of the gripped material here and to dimension said geometry according to the requirements of ISO/TS 15066.

In particular an electromechanical element, which can reliably detect contact with people, animals or items (objects) is preferably connected here between the last axle of the robot on which the gripper is arranged and the gripper system (robot end effector).

In the preferred embodiment, the at least one safety device can be activated and deactivated. The at least one safety device can particularly preferably be activated in monitored areas and deactivated in non-monitored areas. In this context, the geometrically conditioned flexibility is preferably also active, in particular, in the non-monitored areas.

In order to operate the collision-detection device, the application firstly has to be divided into monitored areas and non-monitored areas. The monitored area is preferably a safe environment in which collisions are not conceivable and in which, for example, gripper activities are carried out by the handling device and in which the safety device or the collision-detection device can be locked and therefore deactivated. The non-monitored area is, in contrast, an unsafe environment in which collisions with people are also possible and conceivable, and accordingly areas in which collisions have to be detected and in which the safety device or collision-detection device is operated in a non-locked fashion.

In the non-monitored area, the safety device is deactivated and is accordingly preferably in an unlocked state and particularly preferably carries out only the damping function then. As a result of this unlocked state, the collision-detection device preferably reacts significantly more sensitively to very small changes in distance than in a locked state in which the flange plate can absorb significantly greater forces and torques. Accordingly, even when there are very small changes in distance the handling device is preferably stopped in the non-monitored area.

In one preferred embodiment, the safety device is a damping element and/or a locking element. The safety device and, in particular, the damping element can therefore particularly preferably be an airbag or a spring which preferably simultaneously also act as a locking device and particularly preferably as a positively engaging lock. Both in the activated state and in the deactivated state, in which only the damping function is then carried out by the safety device, the air pressure within the airbag or the spring force preferably changes when force acts on this safety device, bringing about a change in distance of the flange plate, which the at least one sensor detects, and particularly preferably the safe distance-measuring device, particularly preferably detect.

It is preferably also possible to provide more than one locking element, and the collision-detection device or the safety device particularly preferably has two locking elements, wherein one of these locking elements preferably does not carry out an additional damping function.

In a further preferred embodiment, the locking element is a frictionally engaging locking element and/or a positively engaging locking element. Accordingly, the collision-detection device particularly preferably has a frictionally engaging locking element and a positively engaging locking element. The frictionally engaging locking element is preferably the abovementioned airbag, a spring device or the like. However, frictionally engaging locking by means of, for example, magnetic closures would preferably also be conceivable. The positively engaging locking means is preferably a switch with an activation element which latches into a recess in a housing of the collision-detection device.

The airbag can accordingly assume both the damping function and the locking functions. If a positively engaging locking element is not used, the airbag preferably serves as a frictionally engaging locking element. In the event of the airbag operating as a locking element, the air pressure in the airbag must be sufficiently large to minimize or prevent movements of the flange plate.

In the non-monitored area, all the locking devices which are present must preferably be in an unlocked state in this context.

When the handling device moves in non-monitored environments, the safety device or the collision-detection device is preferably not locked. This means that neither the (optional) positively engaging locking means nor the frictionally engaging locking means, preferably embodied as an airbag, is activated. Thus preferably the flange plate on which the gripper is mounted is freely movable over all six degrees of freedom while being damped by means of the damping element such as, for example, the airbag or a similarly acting damper system, for example mechanical springs. Accordingly, in the event of a collision the gripping jaw can preferably pivot slightly, conditioned by the geometry flexibility, together with the flange plate, and can, in particular, pivot about a central attachment of the gripper system, as is illustrated in more detail in the figures.

In this case, collisions of objects with the gripper or the gripped material are reliably detected by means of the sensor and preferably the distance-measuring system and passed on to a controller of the handling device for the purpose of immediate deactivation of the movement (safe stop 1, SS1).

The distance-measuring system is preferably composed here of three capacitive sensors, such as, in particular, capacitors, which are distributed on a mounting element of the collision-detection device and are particularly preferably arranged at an angle of 120° with respect to one another. The distance-measuring system preferably has here at least two, preferably three and particularly preferably four of these capacitive sensors which are arranged at the same distance or angle with respect to one another on a circular path. The distance-measuring system is preferably a two-channel safety device which meets the performance level e. The performance level (PL) is a value which describes the capability of safety-related parts of controllers to carry out a safety function under predictable conditions. The level e denotes here the probability of a dangerous failure per hour (PFHd) 1/h for $\geq 10^{-8}$ and $<10^{-7}$ (0.000001% to 0.00001%).

In cases in which the gripper system together with the gripped material is in monitored environments and possibly carries out gripper activities or the like, the safety device or collision-detection device locks in a frictionally engaging and/or positively locking fashion. Therefore, significantly greater transverse forces and transverse torques can be implemented on the gripping jaws without bringing about triggering by means of the distance-measuring system.

The collision-detection device particularly preferably has electrical and/or pneumatic connections for the purpose of frictionally engaging and/or positively engaging locking. In a preferred embodiment, the locking element is preferably an electrical and/or mechanical locking element. The electrical locking element is preferably an electrically activated switch or the like, and the mechanical locking element is preferably magnets or the like.

In a further preferred embodiment, a sensitivity of the collision-detection device depends on mechanical damping constants such as, for example, the air pressure or spring force and/or software-based information of the sensor such as, for example, the processing of the information from the distance-measuring system.

In a further advantageous embodiment, the collision-detection device is arranged on the handling device, and in particular on the flange plate of the gripper system, by means of a mounting element. The collision-detection device is accordingly preferably an independent structural unit and can be arranged on the handling device by means of mechanical, electrical and/or pneumatic interfaces. This structural unit is preferably composed here of the mounting element and the safety device with all the sensors, locking elements and damping elements.

The collision-detection device can therefore advantageously easily be exchanged and replaced and can preferably also be easily retrofitted on existing handling devices. The mounting element is preferably embodied according to DIN EN ISO 9409 and can be attached to any desired handling devices and receptacle devices of any desired gripper systems. The sensors and/or the abovementioned capacitive sensors of the distance-measuring device are preferably arranged on the mounting element.

In a further preferred embodiment, the handling device has an electrical and/or fluidic conduction means which extends at least from the gripper to the flange plate. This ensures that the change in force and torque in the event of a collision is passed on.

As has been described above in detail, the collision-detection device for protecting grippers/gripped material is based on the fact that initially the movement space is divided into monitored areas and non-monitored areas. If grippers with different weights and different sizes are gripped, the movement space is to be divided, and the sensitivity of the collision-detection device is to be adjusted, on the basis of the most unfavorable case. As a rule, these are the largest and/or heaviest gripped materials, wherein the standard specifications of ISO/TS 15066 are to be complied with for every gripped material.

A wobble plate can preferably also be provided as a damping element. According to the functional principle described above, a collision of the gripper system with the object is preferably detected by means of a change in distance of the wobble plate from the sensor and preferably from a proximity switch, and an emergency stop of the handling device is initiated. The movement of the handling device is stopped as a result and dangerous squeezing or shearing according to ISO/TS 15066 is prevented. Therefore, in unsafe environments (non-monitored area) a change in distance of the wobble plate from the proximity switch owing to the mass inertia of the gripper/gripped material is not detected in the case of planned acceleration processes and braking processes, magnetic closures are preferably integrated into the wobble plate, which closures implement a permissible minimum degree of friction.

In a safe working environment (monitored area) in which collisions with persons are impossible, the wobble plate can preferably be secured in a frictionally engaging fashion by means of a pneumatic cylinder. The connection of the pressure which is necessary for this is preferably implemented by means of a pneumatic valve which is embedded in a suitable safety circuit.

The present disclosure is also directed at a method for detecting a collision between a handling device, in particular a gripper system of the handling device, and an object, wherein forces and/or torques which occur at at least one gripping jaw of the gripper system are taken up from a safety device of a collision-detection device via a flange plate on which the gripping jaw is arranged, and changes in distance which result from this are detected by at least one sensor, and when predefined values are exceeded an emergency stop of the handling device is initiated.

The safety device is preferably here a damping element such as an airbag or a spring and/or a frictionally engaging locking element. In addition a frictionally engaging locking element such as, for example, an electrically or pneumatically activated switch, can advantageously be provided. When there is a force effect on this safety action, the air pressure or the spring force changes, giving rise to a change in distance which is reliably detected by the distance-measuring device.

Accordingly, in respect of the method a collision-detection device is also proposed which detects a change in distance of the safety device by means of a sensor, which is an indication of a collision of the gripper system with an object, such as in particular a person or an item.

In particular, forces and torques which are produced in the event of a collision of a gripper/gripped material with an object are passed on via the gripping jaws and the flange plate and absorbed by the safety device such as, for example, the airbag or the spring packet. As a result, a change in distance occurs owing to the mechanical design of the collision-detection device and is detected by the sensor. The change in distance is then suitably processed according to the application-specific needs and the specifications of the ISO/TS 15066. If the processing means detects an emergency stop situation, an emergency stop signal is transmitted to the controller of the handling device, which implements a safe stop of the handling device together with the gripper and, under certain circumstances, also the gripped material.

BRIEF DESCRIPTION OF THE DRAWINGS

Further advantages and embodiments emerge from the appended drawings, in which.

DETAILED DESCRIPTION

Figure 1:
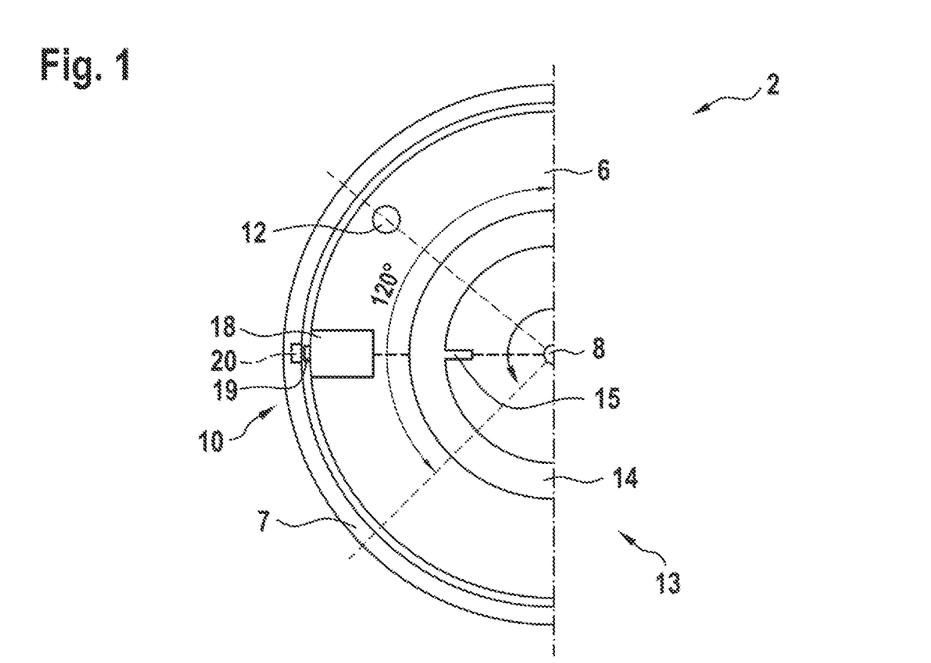
FIG. 1 shows a schematic plan view of a partial section of a first inventive embodiment of the collision detection device in an unsafe environment.

FIG. 1 shows a schematic plan view of a partial section through a first inventive embodiment of the collision-detection device 10 in an unsafe environment. This collision-detection device 10 is arranged here on a gripper system 2 of a handling device (not illustrated in more detail) and has, in particular, a sensor 12 and a safety device 13.

Figure 2:
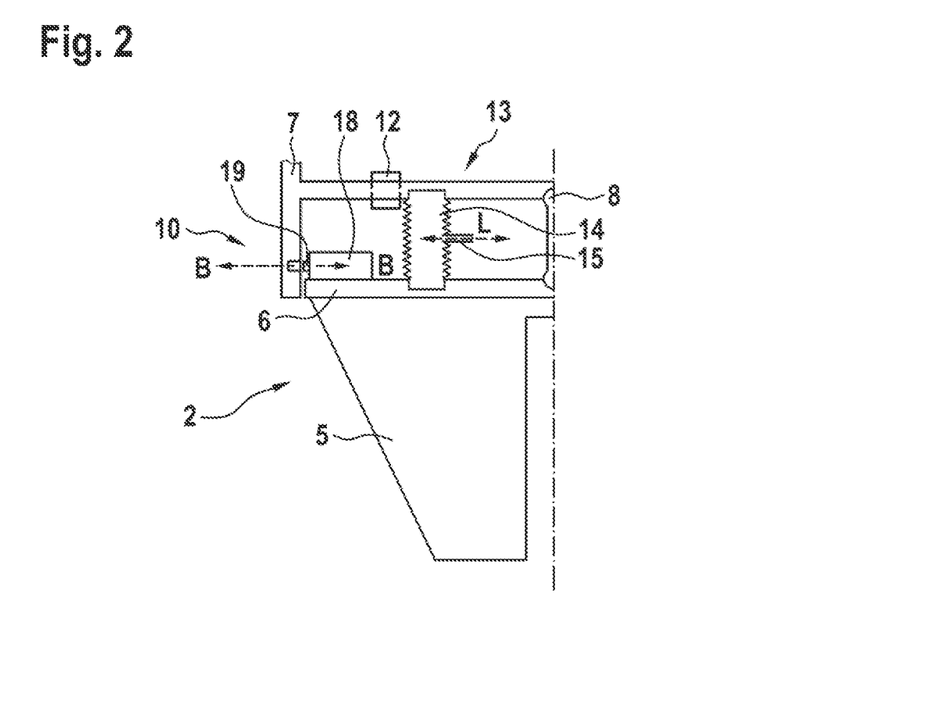
FIG. 2 shows a schematic side view of the first inventive embodiment of the collision-detection device (shown in FIG. 1) in an unsafe environment.
Figure 3:
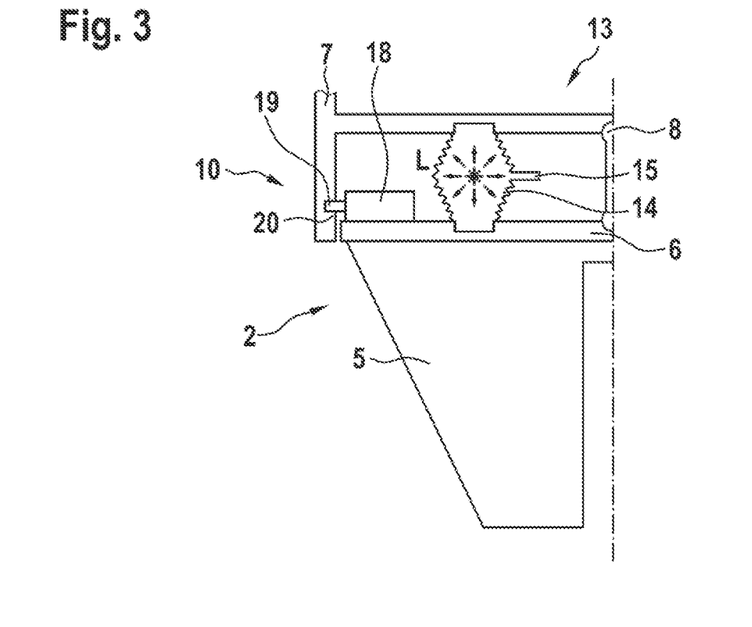
FIG. 3 shows a further schematic illustration of the first inventive embodiment of the collision-detection device in a safe environment.
Figure 4:
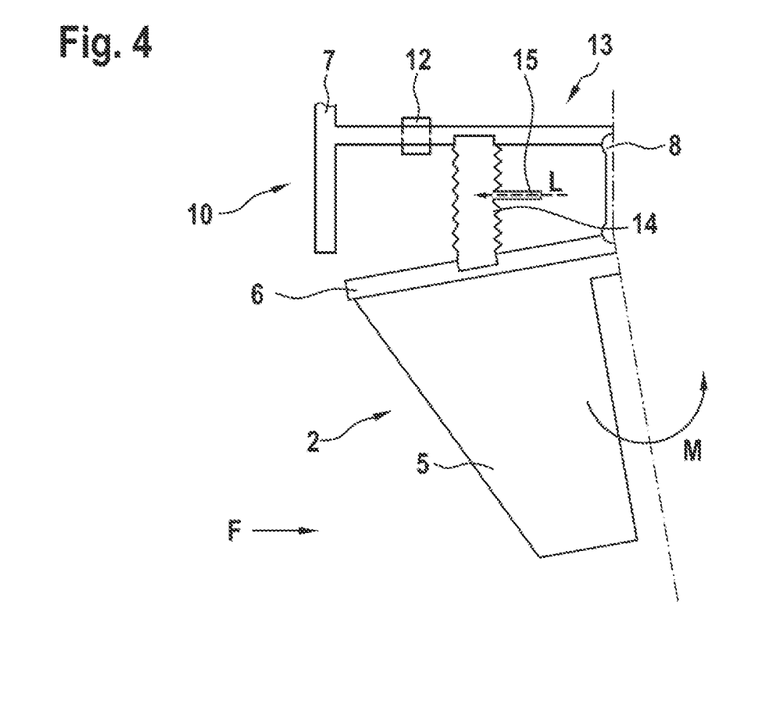
FIG. 4 shows a further schematic illustration of the first inventive embodiment of the collision-detection device.

The safety device 13 is suitable and provided here for locking the collision-detection device 10 with a flange plate 6, on which, as illustrated in more detail in FIGS. 2-4, the gripper system 2 and, in particular, the gripping jaw 5 are arranged, and to damp this flange plate 6. In particular, in this context the safety device 13 has in this embodiment a damping element 14 and an optional positively engaging locking device 18.

The damping element 14 is embodied in this embodiment as an airbag which can, in particular, also act as a locking element for locking the flange plate 6. Air can be fed into or discharged from the damping element 14 via the inlet and outlet valve 15.

Furthermore, it is apparent from FIG. 1 that the positively engaging locking element 18 is not activated and accordingly, in particular, an activation element 19 is not located in a recess 20 of a mounting element 7. Accordingly, FIG. 1 illustrates the situation in which the handling device or the gripper system 2 is in an unsafe environment in which collisions with people are possible. Accordingly, the damping element 14 merely also performs its damping effect, and does not perform a locking function. The abovementioned mounting element 7 serves here, in particular, to attach the collision-detection device 10 to the flange plate 6 of the handling device.

The sensor 12 is preferably a distance-measuring device which in this exemplary embodiment detects a change in distance of the flange plate 6. The arrow characterizes here an angle of 120°, and therefore the position of a further sensor in the event of three sensors being arranged. Four sensors are provided, which means they are correspondingly arranged at an angle of 90° with respect to one another.

The reference symbol 8 also characterizes a central attachment device on which the flange plate 6 and the gripping jaw 5 are arranged and about which they can be pivoted together through 6 degrees of freedom in an unlocked state, conditioned by the geometric flexibility.

FIG. 2 shows a schematic side view of the first inventive embodiment (shown in FIG. 1) of the collision-detection device 10 in an unsafe environment. In this illustration it is also apparent here that the collision-detection device 10 is not locked by the frictionally engaging locking element 18 and the damping element 14. The inlet and outlet valve 15 of the damping element 14 is open in the non-locked state here, so that an air flow L is possible in both directions, and a relatively low air pressure in comparison with the locked state is present in the damping device 14, in particular the airbag.

When there is a force effect on the gripping jaw 5, the movement of the flange plate which results from this causes the air pressure within the airbag to change and triggers a movement of the gripping jaw 5, as shown in FIG. 4. During this movement, the gripping jaw 5 can preferably pivot through 6 degrees of freedom about the central attachment device 8. The movement is also made possible here, in particular, by the structure of the damping element 14, which permits extension of the damping element 14. In addition, this change in the air pressure brings about a change in distance of the flange plate 6, which is detected by the sensor 12 and is passed on to a controller (not illustrated) for the purpose of stopping the travel movement of the handling device.

The reference symbol B characterizes the direction of movement of the activation element 19 of the positively engaging locking element 18.

FIG. 3 shows a further schematic illustration of the first inventive embodiment of the collision-detection device 10 in a safe environment. In this safe environment a collision with people or items is not conceivable, and the collision-detection device 10 is therefore in a locked state, so that relatively large forces and torques can be absorbed at the gripping jaw 5.

The activation element 19 of the positively engaging locking element 18 is accordingly in the recess 20 of the mounting element 7. Furthermore, in this embodiment the damping element 14 also acts as a locking element, for which purpose the inlet and outlet valve 15 is closed so that an air flow from the inside to the outside and the outside to the inside is not possible and an air pressure in the interior of the damping element 14 is higher than in the non-locked state. As a result of this relatively high air pressure, in particular relatively small movements of the flange plate 6 are permitted. As is apparent from FIG. 3, an air flow L exclusively in the interior of the damping element 14 is possible. When there is a force effect on the gripping jaw 5, a movement of the flange plate 6 is generated, as a result of which the air pressure in the interior of the damping element 14 increases and expands. The change in pressure of the flange plate 6 is detected by the sensor (not illustrated here). However, in this context a greater increase in air pressure is permitted in a safe environment than in an unsafe environment, before a stop of the handling device is generated.

FIG. 4 shows a further schematic illustration of the first inventive embodiment of the collision-detection device 10. This illustration shows here, in particular, the movement of the gripping jaw 5 and of the flange plate 6 about the central-attachment device 8 in an unsafe environment (not locked) in the event of a collision.

In particular it is conceivable here that the air pressure in the interior of the damping element 14 increases through an air flow L from the outside into the interior of the damping element 14 as a result of the collision or the forces and torques which increase as a result thereof and the change in distance of the flange plate 6. As a result, the damping element 14 expands owing to the structure in the longitudinal direction and brings about pivoting of the gripping jaw 5, so that injuries in the case of collisions with people or damage in the case of collisions with items can be prevented. At the same time, this change in distance of the flange plate 6 is also detected by the sensor 12 and correspondingly a stop of the travel movement of the handling device is generated by means of a control device (not illustrated).

The reference signs or arrows F and M characterize the forces and torques acting on the gripping jaw 5.

Figure 5:
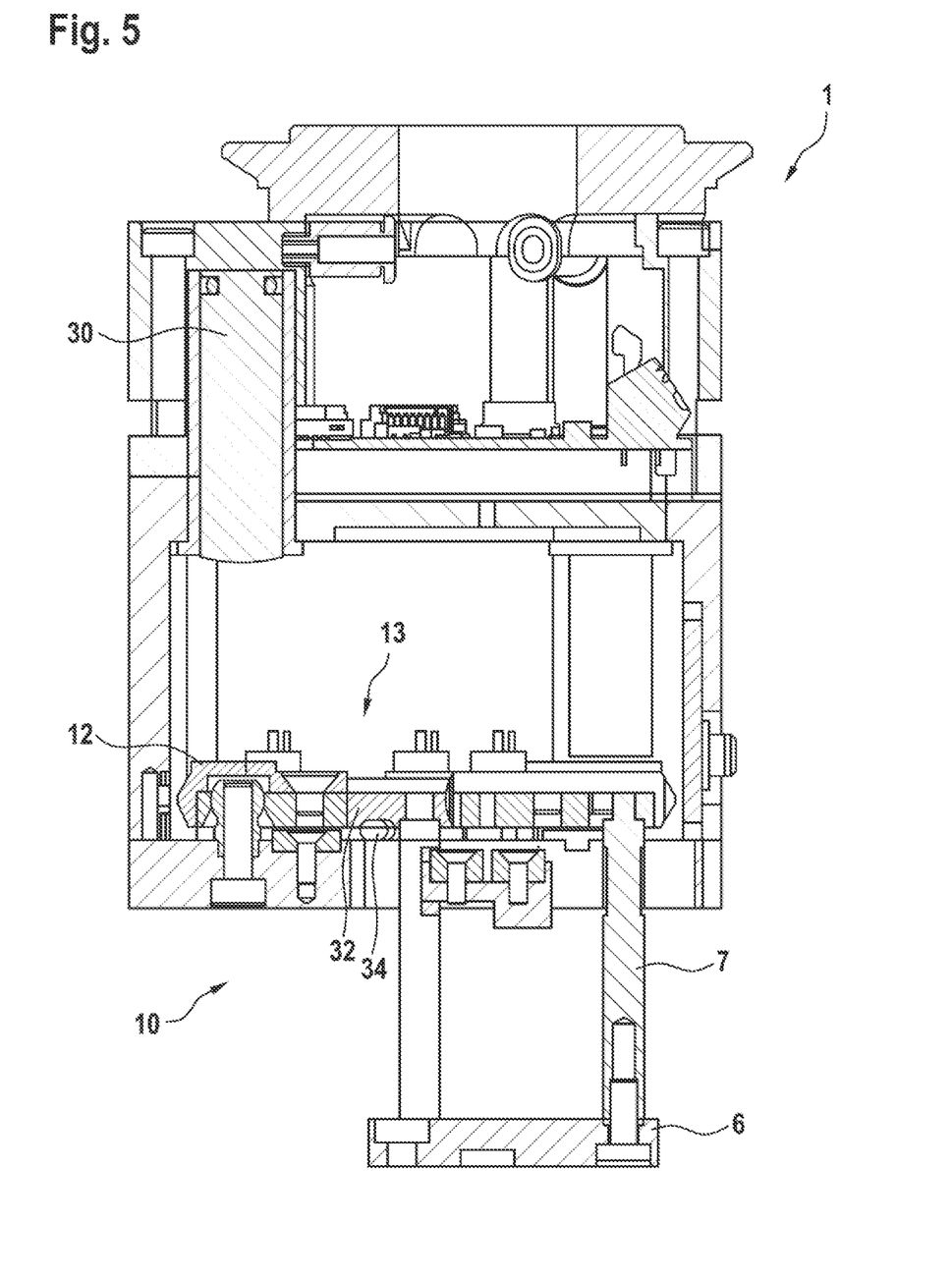
FIG. 5 shows a schematic illustration of a second inventive embodiment of the collision-detection device in an unsafe environment.

FIG. 5 shows a schematic illustration of a second inventive embodiment of the collision-detection device 10 in an unsafe environment. In this embodiment, the safety device 13 has a wobble plate 32 with mount 34 as a damping element. Furthermore, a pneumatic cylinder 30 is provided as the locking element. Since the handling device 1 is located in an unsafe environment in which collisions with objects and, in particular, people and items are tendentially possible, the handling device 1 is not locked by means of the pneumatic cylinder 30.

If a collision then takes place between the gripping jaw (not illustrated in this illustration) which is arranged on the flange plate 6 and the object detects the sensor 12, which is preferably a proximity switch here, detects a change in distance of the wobble plate 32 with respect to the sensor 12, as a result of which an emergency stop of the handling device 1 is initiated.

The reference sign 7 also in turn characterizes here a mounting element 7 by means of which the collision-detection device 10 is arranged on the handling device 1. It is apparent here that the wobble plate 32 is connected to the mounting element 7.

A collision of an object with the housing or the mounting element 7 of the collision-detection device 10 can additionally be prevented, for example, by means of a capacitive sensor skin (not illustrated) on the mounting element 7.

Figure 6:
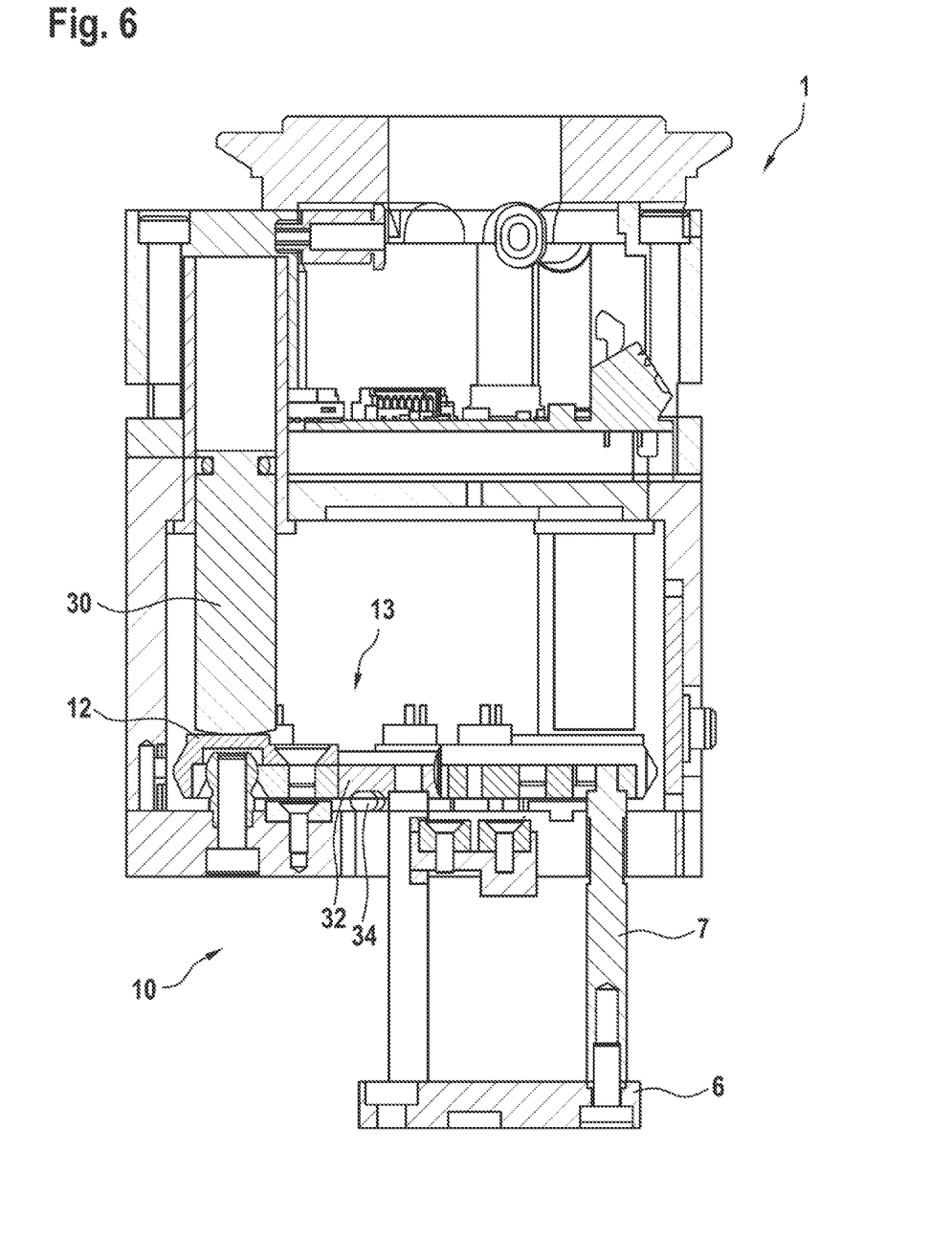
FIG. 6 shows a further schematic illustration of a second inventive embodiment of the collision-detection device in a safe environment.

FIG. 6 shows a further schematic illustration of a second inventive embodiment of the collision-detection device 10 in a safe environment. In this safe working environment, collisions with people are not possible, so that the wobble plate 32 is secured here in a frictionally engaging fashion by means of the pneumatic cylinder 30. The connection of the pressure necessary for this can be made by means of a pneumatic valve which is embedded in a suitable safety circuit.

When there is a collision of the gripping jaw, a change in force and torque is correspondingly transmitted again to the wobble plate 32 and its mount 34 via the flange plate 6, and a resulting change in distance is detected by the sensor 12.

The applicant reserves the right to claim all features disclosed in the application documents as essential to the disclosure insofar as they are novel, either individually or in combination, with respect to the prior art. It is also to be noted that in the individual figures features have also been described which can be advantageous in themselves. A person skilled in the art will immediately recognize that a specific feature which is described in a figure can be advantageous even without transferring further features from this figure. In addition, a person skilled in the art will recognize that advantages can also arise through a combination of a plurality of features which are shown in individual figures or in different figures.

What is claimed is:

1. A collision-detection device for a gripper system of a handling device for detecting collisions between the gripper system and an object, wherein the gripper system has at least two gripping jaws which are configured to move with respect to one another in order to open and close and which are arranged on a flange plate, comprising:
    at least one safety device configured to at least one of lock the collision-detection device to the gripper system, and dampen the collision-detection device with the gripper system, the at least one safety device configured to receive from the flange plate at least one of a change in force and a change in torque generated by contact between at least one of the at least two gripping jaws and the object; and
    at least one sensor configured to detect a change in distance which exceeds a predetermined permissible change in distance between the flange plate and a reference, the change in distance resulting from the at least one of the change in force and the change in torque.

2. The collision-detection device according to claim 1, wherein the at least one safety device is configured to be selectively activated and deactivated.

3. The collision-detection device according to claim 2, wherein:
    the at least one safety device includes a locking element; and
    the locking element is at least one of a frictionally engaging locking element and a positively engaging locking element.

4. The collision-detection device according to claim 2, wherein:
    the at least one safety device includes a locking element; and
    the locking element is at least one of an electrical and mechanical locking element.

5. The collision-detection device according to claim 1, wherein the at least one safety device is configured to be activated in monitored areas and configured to be deactivated in non-monitored areas.

6. The collision-detection device according to claim 1, wherein the at least one safety device is at least one of a damping element and a locking element.

7. The collision-detection device according to claim 1, wherein:
    a sensitivity of the collision-detection device depends on at least one of mechanical damping constants and software-based information of the sensor.

8. The collision-detection device according to claim 1, further comprising:
    a mounting element mounting the collision-detection device on the flange plate.

9. The collision-detection device according to claim 1, further comprising:
    at least one of an electrical and a fluidic conduction device which extends at least from the gripping jaws to the flange plate.

10. A method of detecting a collision between a gripper system of a handling device and an object, comprising:
    generating at least one of a force and a torque by contact between a gripping jaw of the gripper system and the object;
    transferring the at least one of the force and the torque from the gripping jaw of the gripper system through a flange plate supporting the gripping jaw to a safety device of a collision-detection system;
    detecting with a sensor a change in distance between the flange plate and a reference resulting from the at least one of the force and the torque; and
    initiating an emergency stop when the detected change in the distance exceeds a predetermined value.

\* \* \* \* \*